(12) United States Patent
Ahiakpor et al.

(10) Patent No.: US 8,799,786 B2
(45) Date of Patent: Aug. 5, 2014

(54) SCHEDULED MESSAGE CLEANUP (75) Inventors: Michael James Ahiakpor, San Francisco, CA (US); Steven D. Kafka, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 13/083,987

(22) Filed: Apr. 11, 2011

(65) Prior Publication Data
US 2012/0260193 A1 Oct. 11, 2012

(51) Int. Cl.
G06F 3/00 (2006.01)
G06F 3/048 (2013.01)

(52) U.S. Cl.
USPC .......................................... 715/752; 715/810

(58) Field of Classification Search
USPC .................................. 715/752, 810
See application file for complete search history.

(56) References Cited

U.S. PATENT DOCUMENTS

| | | | | |
|---|---|---|---|---|
| 5,333,266 | A * | 7/1994 | Boaz et al. ..................... | 709/206 |
| 6,647,409 | B1 * | 11/2003 | Sherman et al. ............... | 709/203 |
| 6,693,236 | B1 * | 2/2004 | Gould et al. .................. | 84/477 R |
| 6,772,397 | B1 | 8/2004 | Bates et al. | |
| 6,907,578 | B2 * | 6/2005 | Wilson et al. .................. | 715/837 |
| 7,149,893 | B1 * | 12/2006 | Leonard et al. ............... | 713/154 |
| 7,181,495 | B2 * | 2/2007 | Skladman et al. ............. | 709/206 |
| 7,509,381 | B1 * | 3/2009 | Hutchinson et al. .......... | 709/206 |
| 7,730,147 | B1 | 6/2010 | Derhak et al. | |
| 7,783,715 | B2 | 8/2010 | Muller | |
| 7,890,596 | B2 * | 2/2011 | Guy .............................. | 709/207 |
| 8,010,599 | B2 * | 8/2011 | Chang et al. .................. | 709/203 |
| 8,095,613 | B1 * | 1/2012 | Perkowitz et al. ............ | 709/207 |
| 8,312,096 | B2 * | 11/2012 | Cohen et al. .................. | 709/207 |
| 8,577,803 | B2 * | 11/2013 | Chatterjee et al. ............. | 705/41 |
| 2005/0132010 | A1 * | 6/2005 | Muller .......................... | 709/206 |
| 2005/0188090 | A1 * | 8/2005 | Washburn ..................... | 709/226 |
| 2005/0267944 | A1 * | 12/2005 | Little, II ........................ | 709/207 |
| 2006/0168046 | A1 | 7/2006 | Qureshi | |
| 2007/0168435 | A1 | 7/2007 | Moraca et al. | |
| 2008/0059586 | A1 | 3/2008 | Keohane et al. | |
| 2008/0059590 | A1 * | 3/2008 | Sarafijanovic et al. ....... | 709/206 |
| 2008/0109335 | A1 * | 5/2008 | Keohane et al. ............... | 705/35 |
| 2008/0126489 | A1 | 5/2008 | Potluri et al. | |
| 2008/0201433 | A1 * | 8/2008 | McDonald ..................... | 709/206 |
| 2009/0113329 | A1 * | 4/2009 | Corona .......................... | 715/769 |
| 2009/0144374 | A1 * | 6/2009 | Laborde ......................... | 709/206 |
| 2010/0153500 | A1 * | 6/2010 | O'Sullivan et al. ........... | 709/206 |
| 2011/0119630 | A1 * | 5/2011 | Stroupe et al. ................ | 715/841 |
| 2012/0260187 | A1 * | 10/2012 | Berger et al. ................. | 715/738 |
| 2012/0260193 | A1 * | 10/2012 | Ahiakpor et al. ............. | 715/752 |
| 2013/0097526 | A1 * | 4/2013 | Stovicek et al. .............. | 715/752 |
| 2013/0279681 | A1 * | 10/2013 | Weiner ..................... | 379/207.02 |

OTHER PUBLICATIONS

Ho, et al., "EMMA: An E-Mail Management Assistant", Retrieved at <<http://ieeexplore.ieee.org/stamp/stamp.jsp?tp=&arnumber=1241050>>, Proceedings of the IEEE/WIC International Conference on Intelligent Agent Technology, Oct. 27, 2003, pp. 8.
"Email Archiving with MailStore Basics", Retrieved at <<http://en.help.mailstore.com/Email_Archiving_with_MailStore_Basics>>, Retrieved Date: Jan. 28, 2011, pp. 8.
"Outlook 2007: Give a Message an Expiration Date", Retrieved at <<http://www.tech-recipes.com/rx/2348/outlook_2007_give_message_expirati . . . >>, May 9, 2007, pp. 8.

* cited by examiner

*Primary Examiner* — David Phantana Angkool
(74) *Attorney, Agent, or Firm* — Bryan Webster; Andrew Sanders; Micky Minhas (57) ABSTRACT

Scheduled message cleanup techniques are described. In one or more implementations, a method implemented by one or more computing devices includes detecting that a message has been received from a sender for delivery via a user account. Responsive to a determination that an option has been selected for the sender in association with the user account, a previous message from the sender that is to be delivered via the user account is removed and the detected message is kept for delivery via the user account.

26 Claims, 5 Drawing Sheets

SCHEDULED MESSAGE CLEANUP

BACKGROUND

The amount of messages with which a typical user may interact in a given day is ever increasing. For example, a user may receive a multitude of emails that vary in an amount of importance to a recipient of the emails. The user, for instance, may receive work emails and personal emails in an account. The user may also receive emails that are sent periodically from a sender that may have varying degrees of interest to the user, such as newsletters, offers for sale, and so on.

However, traditional techniques that were employed to interact with the messages generally did not differentiate between these messages. Consequently, a user was often forced to navigate through each of the messages using traditional techniques to locate a particular message of interest. This could be both time consuming and frustrating to the user especially when considering the vast number of emails and other messages even a typical user may receive in a day.

SUMMARY

Scheduled message cleanup techniques are described. In one or more implementations, a method implemented by one or more computing devices includes detecting that a message has been received from a sender for delivery via a user account. Responsive to a determination that an option has been selected for the sender in association with the user account, a previous message from the sender that is to be delivered via the user account is removed and the detected message is kept for delivery via the user account.

In one or more implementations, a method implemented by one or more computing devices includes detecting that a message has been received from a sender for delivery via a user account. Responsive to a determination that an option has been selected for the sender in association with the user account, the message is deleted after a predefined amount of time has passed as specified in conjunction with the option.

In one or more implementations, a user interface is displayed by a client device via which a plurality of emails is viewable. One or more options are displayed in conjunction with the user interface by the client device, including a first option that is selectable to cause a most recent email that is received from a specified sender to be saved and at least one other previous email from the sender to be removed automatically and without user intervention upon receipt of the most recent email and a second option that is selectable to cause one or more emails from a sender specified through interaction with the user interface to be removed after a predefined amount of time has passed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users have access to a variety of different messages. However, some of these messages may have varying degrees of importance to the user. For example, a more recent email from a sender may supersede one or more previous emails from the sender. Consequently, the previous emails may add to the clutter of a user interface designed to provide interaction with the emails.

Scheduled message cleanup techniques are described. In one or more implementations, options are provided that may help to manage which messages (e.g., emails) are available for output in a user interface. For example, the user interface may include an option to automatically remove previous emails from a sender upon receipt of a more recent email from the sender. A user, for instance, may set this option for a sender of a newsletter such that a most recent version of the newsletter is available via the user interface but previous versions are not.

In another example, an option may be provided to automatically remove emails from a particular sender after a predefined amount of time has passed. A user, for instance, may set an option for a particular sender such that emails are automatically removed (e.g., deleted or archived) after a threshold amount of time has passed, e.g., 30 days. A variety of other options may also be specified to perform scheduled message cleanup, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
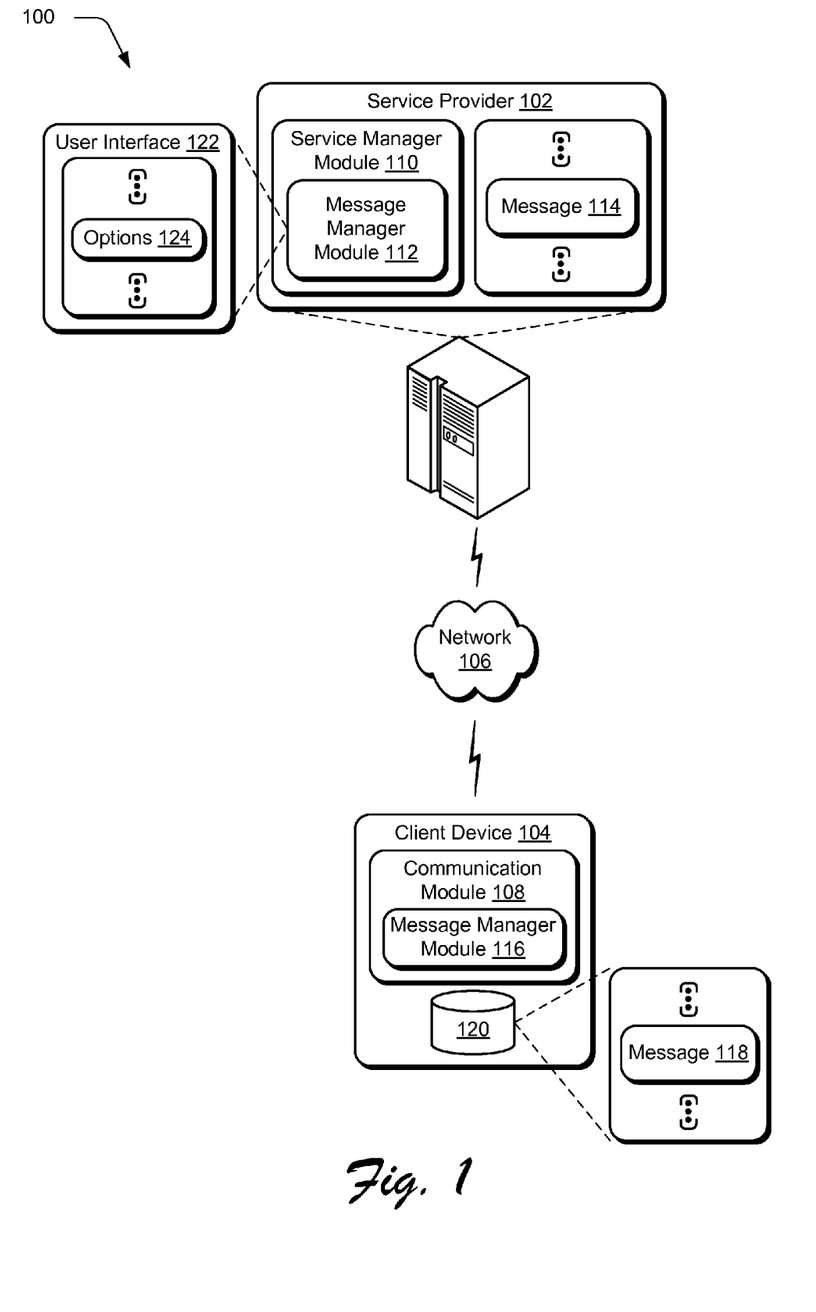
FIG. 1 is an illustration of an environment in an example implementation that is operable to employ scheduled message cleanup techniques.

FIG. 1 is an illustration of an environment 100 in an example implementation that is operable to employ techniques described herein. The illustrated environment 100 includes a service provider 102 that is communicatively coupled to a client device 104 via a network 106. The service provider 102 and the client device 104 may be implemented using a wide variety of computing devices.

For example, a computing device may be configured as a computer that is capable of communicating over the network 106, such as a desktop computer, a mobile station, an entertainment appliance, a set-top box communicatively coupled to a display device, a wireless phone, a game console, a server, and so forth. Thus, the computing device may range from full resource devices with substantial memory and processor resources (e.g., servers, personal computers, game consoles) to a low-resource device with limited memory and/or processing resources (e.g., traditional set-top boxes, hand-held game consoles). Additionally, although a single computing device is shown (e.g., a server for the service provider 102), the computing device may be representative of a plurality of different devices, such as multiple servers utilized by a business to perform operations, a remote control and set-top box combination, an image capture device and a game console configured to capture gestures, and so on.

A computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 106 is illustrated as the Internet, the network may assume a wide variety of configurations. For example, the network 104 may include a wide area network (WAN), a local area network (LAN), a wireless network, a public telephone network, an intranet, and so on. Further, although a single network 106 is shown, the network 106 may be configured to include multiple networks.

The client device 104 is further illustrated as including a communication module 108. The communication module is representative of functionality of the client device 104 to communicate via the network 106, such as with the service provider 102. For example, the communication module 108 may incorporate browser functionality to navigate the network 106, may be configured as a dedicated application having network access functionality (e.g., obtained via an application marketplace accessible via the network 106), and so on.

The service provider 102 is illustrated as including a service manager module 110, which is representative of functionality to provide and manage access to one or more services via the network 106. The service manager module 110, for instance, may incorporate revenue techniques to collect revenue for provision of the services, such as directly (e.g., for a fee), on a subscription basis, indirectly through inclusion of one or more advertisements, collection of fees as a portal for a "click through," and so on.

One example of a service is illustrated through inclusion of a message manager module 112. The message manager module 112 is representative of functionality of the service provider 102 to manage communication of one or more messages 114. The messages 114, for instance, may be formed through interaction with the message manager module 112 by the client device 104 for communication via a user account (e.g., user@serviceprovider.com, phone number) of the service provider 102 to another user. This communication may be performed in a variety of ways, such as directly through another user account of the service provider 102, through communication to a user account associated with another service provider 102, and so on.

The messages 114 may also be representative of messages received by the service provider 102 to be communicated via user accounts to users associated with the service provider 102. The service provider 102, for instance, may receive a message 114 from another service provider 102 and store that message in association with a user account. A user may then access the user account of the service provider 102 to gain access to the message 114, such as by using the communication module 108 of the client device 104. A variety of different messages 114 may be managed by the service provider 102, such as emails, SMS, MMS, instant messages, and other messages capable of being communicated electronically via the network 106. Although the functionality was described in this instance as available "over the cloud" from the service provider 102, this functionality may also be incorporated locally by the client device 104 itself. An example of this is illustrated by inclusion of a message manager module 116 at the client device 104 that is configured to manage messages 118 available via local storage 120 of the client device 104. Other implementations are also contemplated, such as local hosting of messages by a business.

As previously described, a user may receive a vast number of messages 114 having varying degrees of importance to the user. Accordingly, the environment 100 may incorporate techniques that may be used to schedule cleanup of the messages. For example, the message manager module 112 may provider a user interface 122 that may be accessed by the client device 104 via the network 106. The user interface 122 may include one or more options 124 that may be used to reduce clutter.

One of the options 124, for instance, may give the user the ability to keep a most recent (e.g., latest) message from a sender. Therefore, receipt of a new message from the send may cause a previous message to be automatically deleted without further user interface.

Another one of the options 124 may allow a user to specify a timeframe for automatic removal (e.g., deletion or archival) of a message after a predefined amount of time. In this way, a user may set the message manager module 112 to automatically remove messages 114 that have achieved a particular age. Further discussion of these and other options 124 may be found in relation beginning in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
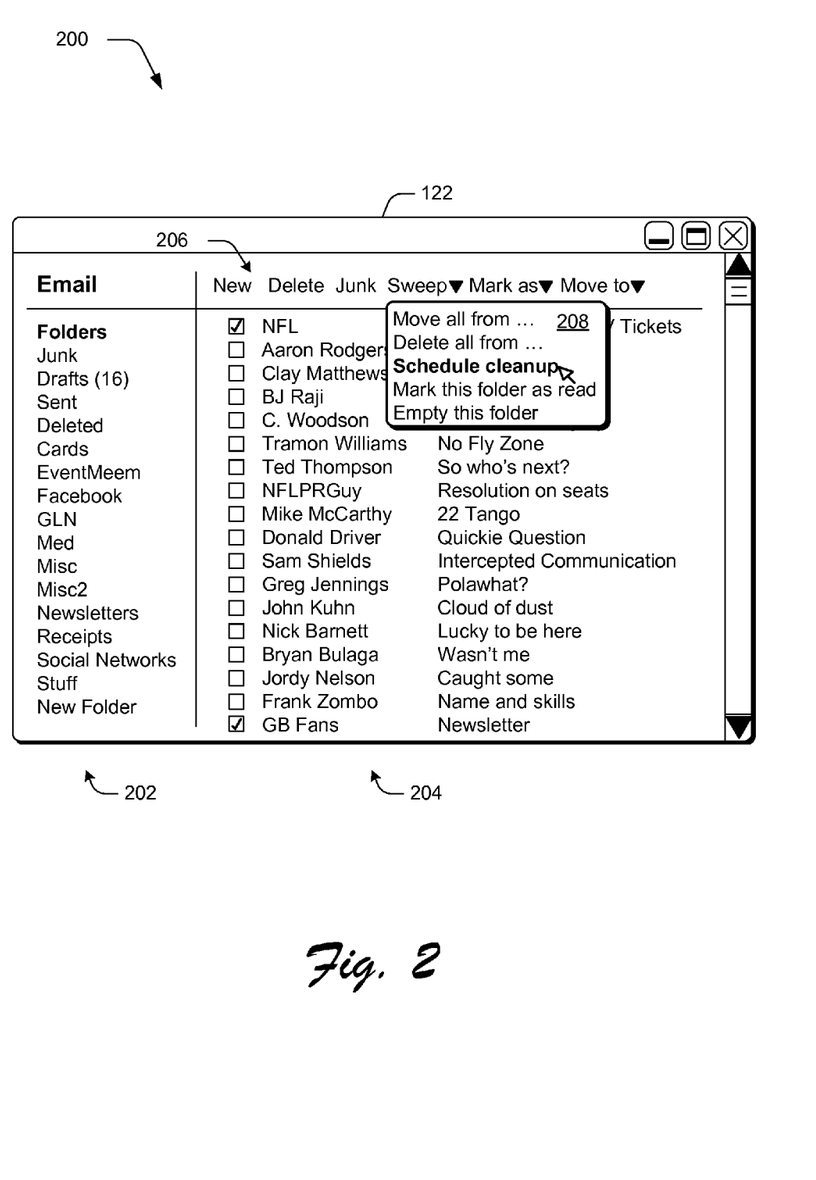
FIG. 2 is an illustration of an example of a user interface of FIG. 1 as configured to cause output of a menu to schedule cleanup of one or more messages.

FIG. 2 is an illustration of an example 200 of a user interface 122 of FIG. 1 as configured to cause output of a menu to schedule cleanup of one or more messages. The user interface 122 includes a section 202 that lists folders that may be used to categorize messages, such as junk, drafts, sent, deleted, and so on.

The user interface 122 is also illustrated as including an inbox 204 that includes messages and a menu 206 of commands that relate to the inbox, examples of which include "new," "delete," "junk," "sweep," "mark as," and "move to." Each of the messages included in the inbox 204 are illustrated as including a box that may be used to select the respective message, examples of selected messages include one from the "NFL" and one from "GB Fans." Naturally, other selection techniques are also contemplated, such as to highlight one or more messages by clicking a cursor control device, selection using a gesture, and so on.

Output of a menu is also illustrated that lists commands that may be applied to selected messages. Examples of commands include "move all from," "delete all from," "schedule cleanup," "mark this folder as read," and "empty this folder." In the illustrated user interface 122, the command "schedule cleanup" is selected through use of a cursor control device, but other selection techniques are also contemplated such as a gesture, voice command, keyboard shortcut, and so on. Responsive to this selection, a schedule cleanup menu is output, further discussion of which may be found in relation to the following figure.

Figure 3:
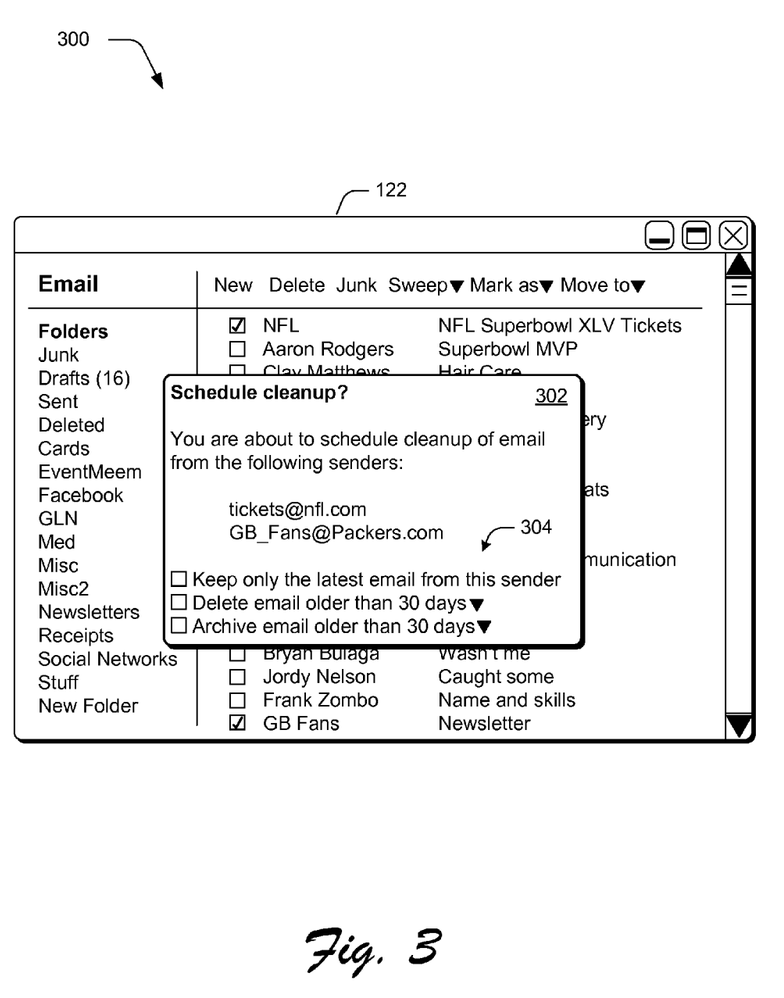
FIG. 3 is an illustration of an example of a user interface of FIG. 1 as outputting a menu responsive to a selection made as shown in FIG. 2 to schedule cleanup of one or more messages.

FIG. 3 is an illustration of an example 300 of a user interface 122 of FIG. 1 as outputting a menu 302 responsive to a selection made as shown in FIG. 2 to schedule cleanup of one or more messages. The menu 302 in this example includes language confirming that "You are about to schedule cleanup of email from the following senders." The menu 302 also identifies the senders being scheduled, which in this instance are the senders that correspond to the messages selected in FIG. 2.

The menu 302 also includes a plurality of options that are configured to employ schedule cleanup techniques. A first option is illustrated to "Keep only the latest email from this sender." By selecting this option, when a new email is received from a sender, older messages are automatically deleted from this sender by the message manager module 112. This may be particularly useful in situations to delete older publications (e.g., newsletters), commercial traffic (e.g., offers), and so on.

The menu 302 as illustrated also includes a second option to "delete email older than 30 days" from the senders and a third option to "archive email older than 30 days" from the senders. These options are illustrated as including a default of 30 days, but are also selectable by a user to specify a threshold, e.g., an amount of time to be used as a basis for determining. In this way, a user may also specify a particular sender (e.g., through selection of FIG. 2), have the selection confirmed in the menu 302 of FIG. 3, and select an option that may be used to schedule a cleanup of messages that relate to the particular sender. As before, selection of the option may be performed in a variety of ways, such as using a cursor control device, a gesture, a spoken command, one or more keystrokes (e.g., a macro), and so forth. In this way, a user may select from a variety of different options 304 to schedule cleanup of messages, further discussion of which may be found in relation to the following section.

Example Procedures

The following discussion describes scheduled message cleanup techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the examples 200, 300 of user interfaces 122 of FIGS. 2 and 3.

Figure 4:
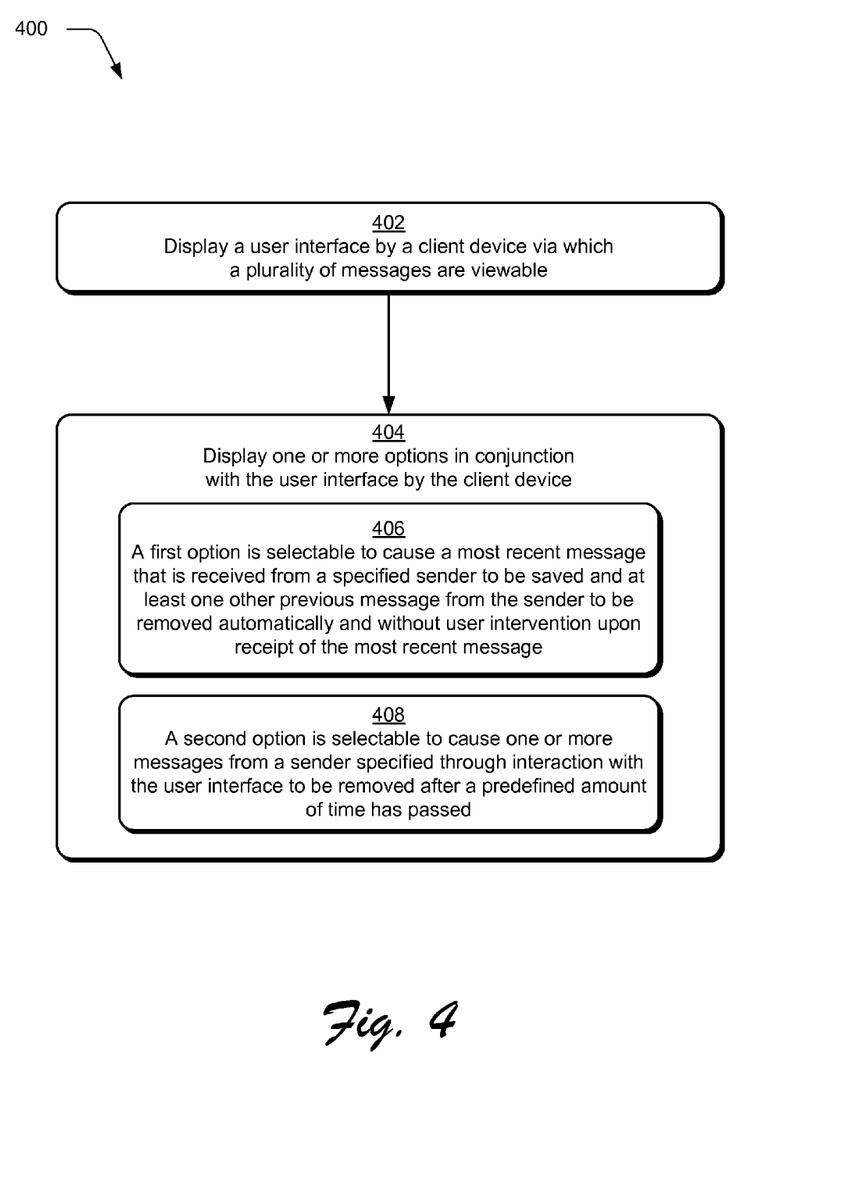
FIG. 4 is a flow diagram depicting a procedure in an example implementation in which a user interface is displayed that includes options to schedule cleanup of messages.

FIG. 4 depicts a procedure 400 in an example implementation in which a user interface is displayed that includes options to schedule cleanup of messages. A user interface is displayed by a client device via which a plurality of messages is viewable (block 402). The example 200 of the user interface 122 of FIG. 2, for instance, depicts an inbox including headers of messages that are viewable by a user when displayed by the client device 104. As previously described, the messages may be accessed remotely via the network 106, locally from local storage 120, and so on.

One or more options are displayed in conjunction with the user interface by the client device (block 404). For example, a first option may be displayed that is selectable to cause a most recent message that is received from a specified sender to be saved and at least one other previous message from the sender to be removed automatically and without user intervention upon receipt of the most recent message (block 406). This option, for instance, may be used to remove older emails when a more "up-to-date" email has been received, such as a newsletter, sales offer, and so on.

In another example, a second option is displayed that is selectable to cause one or more messages from a sender specified through interaction with the user interface to be removed after a predefined amount of time has passed (block 408). In this example, the user may specify an amount of time for a particular sender, past which, emails are to be removed, e.g., deleted, archived (e.g., moved to a particular folder which may be user specified), and so on. This option may have a variety of uses, such as to remove personal and other emails that may no longer be relevant from display in the inbox. In this way, these options may be selected to help reduce clutter in an inbox or other user interface automatically and without further user intervention, further discussion of which may be found in relation to the following figure.

Figure 5:
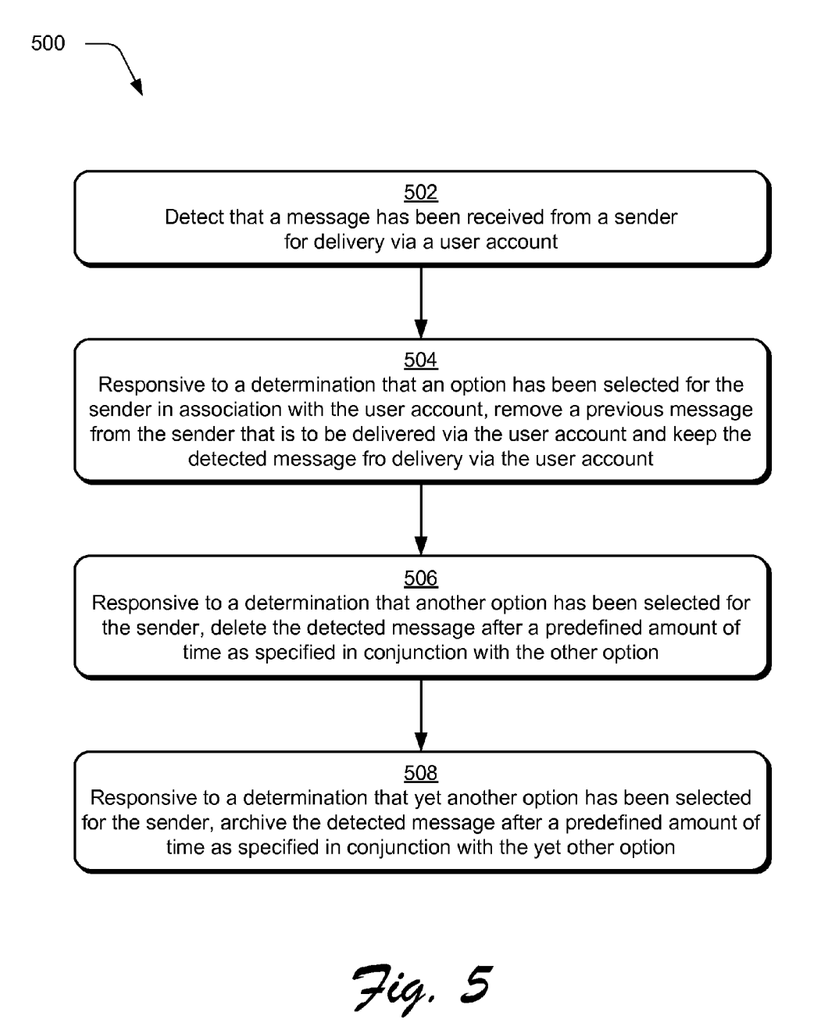
FIG. 5 is a flow diagram depicting a procedure in an example implementation in which a scheduled cleanup of messages is performed responsive to selection of one or more cleanup options.

FIG. 5 depicts a procedure 500 in an example implementation in which a scheduled cleanup of message is performed responsive to selection of one or more cleanup options. A messaged is detected that has been received from a sender for delivery via a user account (block 502). A message manager module 112 of the service provider 102, for instance, may keep a list for one or more user accounts that indicate selection of options for particular senders. Therefore, the message manager module 112 may detect when a message has been received from such a sender.

Responsive to a determination that an option has been selected for the sender in association with the user account, a previous message from the sender that is to be delivered via the user account is removed and the detected message is kept for delivery via the user account (block 504). In this example, the "keep only the latest email from the sender" option 304 has been selected through interaction with the menu 302. Consequently, subsequent messages received from this sender cause removal (e.g., deletion, archiving, or so on) of previous messages from the sender.

Responsive to a determination that another option has been selected for the sender, the detected message is deleted after a predefined amount of time as specified in conjunction with the other option (block 506). A user, for instance, may select the option 304 to "delete email older than 30 days" from the specified sender. The option 304 may also include other predefined amounts of time that may be user specified, such as selection of a dropdown menu, manual entry in a text entry portion, and so on.

Responsive to a determination that yet another option has been selected for the sender, the detected message is archived after a predefined amount of time as specified in conjunction with the yet other option (block 508). A user, for instance, may select the option 304 to "archive email older than 30 days" from the specified sender. As before, the option 304 may also include other predefined amounts of time that may be user specified. In this way, a user may specify a particular sender and particular action (e.g., removal, deletion, or archival of emails) for the sender.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   detecting that a message has been received from a sender for delivery via a user account; and
   responsive to a determination that an option has been selected by a user for the sender in association with the user account:
      removing a previous message from the sender that is to be delivered via the user account; and
      keeping the detected message for delivery via the user account; and
   responsive to a determination that another option has been selected for the sender, deleting the detected message after a predefined amount of time as specified in conjunction with the other option.

2. A method as described in claim 1, wherein the removing includes deleting the previous message or archiving the previous message.

3. A method as described in claim 1, wherein the delivery of the message via the user account includes communication over a network for receipt by a computing device, via which, messages in the user account are accessed.

4. A method as described in claim 1, wherein the delivery of the message via the user account includes display in a user interface by a client device, via which, messages in the user account are accessed.

5. A method as described in claim 1, further comprising responsive to a determination that another different option has been selected for the sender, archiving the detected message after a predefined amount of time as specified in conjunction with the other different option.

6. A method as described in claim 1, wherein respective selection of the options is performed through interaction with a user interface output by a client device, the user interface configured to specify the sender.

7. A method as described in claim 1, wherein the message is an email, a SMS text, a MMS text, or an instant message.

8. A method implemented by one or more computing devices, the method comprising:
   detecting that a message has been received from a sender for delivery via a user account; and
   responsive to a determination that an option has been selected by a user for the sender in association with the user account, deleting the message after a predefined amount of time has passed as specified in conjunction with the option, wherein the deleting is performed such that the detected message is displaying in a user interface with which the user account is associated during the predefined amount of time and is not displayable afterward.

9. A method as described in claim 8, wherein selection of the option is performed through interaction with a user interface output by a client device, the user interface configured to specify the sender and the predefined amount of time.

10. A method as described in claim 9, wherein the interaction includes use of a menu displayed over one or more message summaries, the menu configured to receive one or more inputs to select the option.

11. A method as described in claim 9, wherein the interaction includes use of a menu displayed over one or more message summaries, the menu including a representation of the sender.

12. A method as described in claim 8, wherein the message is an email, a SMS text, a MSS text, or an instant message.

13. A method as described in claim 8, further comprising responsive to a determination that another option has been selected for the sender in association with the user account:
   removing a previous message from the sender that is to be delivered via the user account; and
   keeping the detected message for delivery via the user account.

14. A computing device comprising:
   one or more processors;
   one or more computer-readable media embodying computer-readable instructions which, when executed, implement a method comprising:
      detecting that a message has been received from a sender for delivery via a user account; and
      responsive to a determination that an option has been selected by a user for the sender in association with the user account:
         removing a previous message from the sender that is to be delivered via the user account; and
         keeping the detected message for delivery via the user account; and
      responsive to a determination that another option has been selected for the sender, deleting the detected message after a predefined amount of time as specified in conjunction with the other option.

15. The computing device as described in claim 14, wherein the removing includes deleting the previous message or archiving the previous message.

16. The computing device as described in claim 14, wherein the delivery of the message via the user account includes communication over a network for receipt by a computing device, via which, messages in the user account are accessed.

17. The computing device as described in claim 14, wherein the delivery of the message via the user account includes display in a user interface by a client device, via which, messages in the user account are accessed.

18. The computing device as described in claim 14, further comprising responsive to a determination that another different option has been selected for the sender, archiving the detected message after a predefined amount of time as specified in conjunction with the other different option.

19. The computing device as described in claim 14, wherein respective selection of the options is performed through interaction with a user interface output by a client device, the user interface configured to specify the sender.

20. The computing device as described in claim 14, wherein the message is an email, a SMS text, a MMS text, or an instant message.

21. A computing device comprising:
one or more processors;
one or more computer-readable media embodying computer-readable instructions which, when executed, implement a method comprising:
  detecting that a message has been received from a sender for delivery via a user account; and
  responsive to a determination that an option has been selected by a user for the sender in association with the user account, deleting the message after a predefined amount of time has passed as specified in conjunction with the option, wherein the deleting is performed such that the detected message is displaying in a user interface with which the user account is associated during the predefined amount of time and is not displayable afterward.

22. The computing device as described in claim 21, wherein selection of the option is performed through interaction with a user interface output by a client device, the user interface configured to specify the sender and the predefined amount of time.

23. The computing device as described in claim 22, wherein the interaction includes use of a menu displayed over one or more message summaries, the menu configured to receive one or more inputs to select the option.

24. The computing device as described in claim 22, wherein the interaction includes use of a menu displayed over one or more message summaries, the menu including a representation of the sender.

25. The computing device as described in claim 21, wherein the message is an email, a SMS text, a MSS text, or an instant message.

26. The computing device as described in claim 21, further comprising responsive to a determination that another option has been selected for the sender in association with the user account:
  removing a previous message from the sender that is to be delivered via the user account; and
  keeping the detected message for delivery via the user account.

* * * * *